(12) United States Patent
Chapman

(10) Patent No.: US 6,594,280 B1
(45) Date of Patent: *Jul. 15, 2003

(54) METHOD AND APPARATUS FOR SUPPORTING HEADER SUPPRESSION AND MULTIPLE MICROFLOWS IN A NETWORK

(75) Inventor: John T. Chapman, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/188,473

(22) Filed: Jul. 2, 2002

Related U.S. Application Data

(63) Continuation of application No. 09/225,894, filed on Jan. 4, 1999, now Pat. No. 6,438,123.
(60) Provisional application No. 60/107,989, filed on Nov. 10, 1998.

(51) Int. Cl.[7] .................................................. H04J 3/16
(52) U.S. Cl. ........................................ 370/469; 370/474
(58) Field of Search ................................. 370/351, 352, 370/389, 355, 356, 400, 428, 458, 469–477; 725/111, 135, 138, 139–42, 143–151; 375/222

(56) References Cited

U.S. PATENT DOCUMENTS

| | | | |
|---|---|---|---|
| 6,324,267 B1 | 11/2001 | Hraster et al. | |
| 6,438,123 B1 * | 8/2002 | Chapmen | 370/351 |
| 2001/0055319 A1 | 12/2001 | Quigley et al. | |

OTHER PUBLICATIONS

*IT Standards, Cable Modem Standards* by Jeff Langer dated Feb. 22, 1997 consisting of 3 pages (http://www.sis.pitt.edu/18 mbclass/standards/langer/cablest1.html).

*Cable Industry Issues Specification for High–Speed Data Delivery* by Mike Schwartz, CableLabs dated Dec. 11, 1996 consisting of 5 pages, (http://www.cablelabs.com/PR/96cable_spec.html).

*Overview of Cable Modem Technology and Services* by Cable Datacom News, undated, consisting of 6 pages, (http://cabledatacomnews.com/cmic1.htm).

*Data Over Cable Interface Specifications, Cable Modem Termination System–Network Side Interface Specification*, SP–CMTS–NSll01–960702, by Arthur D. Little, Inc., dated Jul. 2, 1996 consisting of 17 pages.

* cited by examiner

*Primary Examiner*—David Vincent
(74) *Attorney, Agent, or Firm*—Marger Johnson & McCollom, PC

(57) ABSTRACT

A first packet processing node in a header suppression mode suppresses transmission of one or more packet headers. A second packet processing node receives the packets from the first packet processing node over a network medium and sends the received packets to an endpoint. The second packet processing node includes a memory that contains the packet headers suppressed by the first packet processing node and appends the stored headers to the suppressed packets before sending the packets to the endpoint. Cable modems (CMs) include one or more Service Identifiers (SIDs) for establishing communication channels (microflows) with a Cable Modem Termination System (CMTS) through a cable medium. In another aspect of the intention, a cable modem network protocol is used between the CMTS and the CM to dynamically establish and modify multiple microflows between the CMTS and CM on the same cable modem SID.

55 Claims, 17 Drawing Sheets

TABLE 1
G.711 (64 kbps)
UPSTREAM CALL DENSITY

|  |  | QPSK 2560 ksps | QPSK 1280 ksps |  |
|---|---|---|---|---|
|  |  | 16 QAM 2560 ksps | 16 QAM 1280 ksps | 16 QAM 640 ksps |
| HEADER SUPPRESSION | 10 ms | 94 | 47 | 23 |
|  | 20 ms | 118 | 59 | 29 |
| NORMAL | 10 ms | 72 | 36 | 18 |
|  | 20 ms | 96 | 48 | 24 |

TABLE 2
G.728 (16 kbps)
UPSTREAM CALL DENSITY

|  |  | QPSK 2560 ksps | QPSK 1280 ksps |  |
|---|---|---|---|---|
|  |  | 16 QAM 2560 ksps | 16 QAM 1280 ksps | 16 QAM 640 ksps |
| HEADER SUPPRESSION | 10 ms | 200 | 100 | 50 |
|  | 20 ms | 290 | 145 | 72 |
| NORMAL | 10 ms | 114 | 57 | 28 |
|  | 20 ms | 188 | 94 | 47 |

TABLE 3
G.729 (8 kbps)
UPSTREAM CALL DENSITY

|  |  | QPSK 2560 ksps | QPSK 1280 ksps |  |
|---|---|---|---|---|
|  |  | 16 QAM 2560 ksps | 16 QAM 1280 ksps | 16 QAM 640 ksps |
| HEADER SUPPRESSION | 10 ms | 228 | 114 | 57 |
|  | 20 ms | 400 | 200 | 100 |
| NORMAL | 10 ms | 123 | 61 | 30 |
|  | 20 ms | 228 | 114 | 57 |

FIG.7C

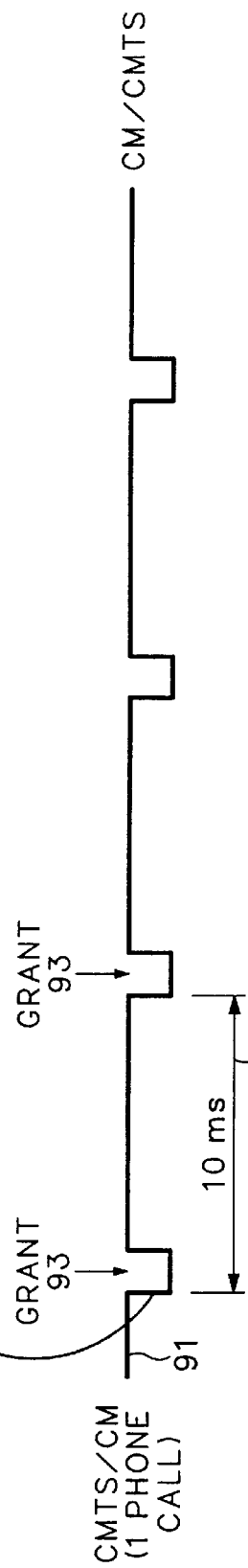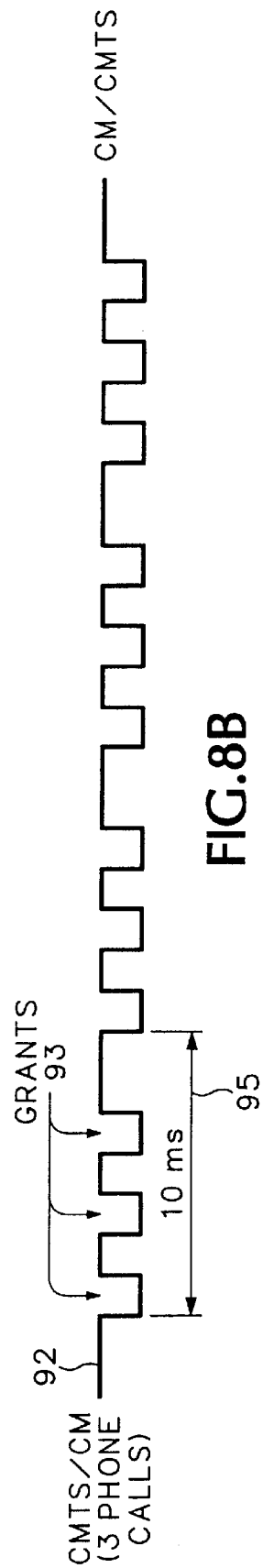

CM INITIATED DSC STATE TABLE 1 OF 3

CMTS INITIATED DSC

CMTS INITIATED DSC STATE TABLE 2 OF 3

CMTS INITIATED DSC
STATE TABLE 3 OF 3

METHOD AND APPARATUS FOR SUPPORTING HEADER SUPPRESSION AND MULTIPLE MICROFLOWS IN A NETWORK

This application is a continuation of prior application Ser. No. 09/225,894 filed Jan. 4, 1999, now U.S. Pat. No. 6,438,123, this application also claims the benefit of provisional application No. 60/107,989, filed Nov. 10, 1998.

BACKGROUND OF THE INVENTION

This invention relates generally to packet networks and more particularly to a packet network that supports packet header suppression and multiple microflows on the same Service Identification field.

A voice or other type of data stream is transmitted over a packet network by first formatting the data stream into multiple discrete packets. For example, in a Voice over Internet Protocol (VoIP) application, a digitized audio stream is quantized into packets that are placed onto a packet network and routed to a packet telephony receiver. The receiver converts the packets back into a continuous digital audio stream that resembles the input audio stream. A codec (a compression/decompression algorithm) is used to reduce the communication bandwidth required for transmitting the audio packets over the network.

A large amount of network bandwidth is used for overhead when a data steam is converted and transmitted as packets. Voice packets have a certain length according to recording time. Typical recording times are usually 10 or 20 milliseconds. Sending packets with longer recording times increase bandwidth efficiency by reducing the percentage of the packet used for overhead and increase the percentage of the packet used for voice payload. The disadvantage of transmitting packets with more voice payload is that the packets have more latency. Thus, for better performance, smaller voice packets (10 ms) are transmitted that each have a higher percentage of packet overhead. The large amount of network bandwidth used for packet overhead reduces the maximum number of connections that can be established on the network.

Cable modem networks are used to carry VoIP packets and other data between a cable modem termination system and multiple cable modems. The cable modems are identified using a Service Identification (SID) field. The cable modems may carry a diverse amount of traffic, both originating from internal ports and from external ports. Each unique combination of source and destination addresses and ports is referred to as a microflow. The number of SIDs assigned to the cable modem may be limited, either due to hardware limitations or network provisioning limitations. As a result, the number of microflows can exceed the number of available SIDs.

Accordingly, a need remains for a system that more efficiently uses bandwidth in a packet network and can also assign multiple microflows to the same Service Identification field.

SUMMARY OF THE INVENTION

Header suppression is used to transport packets more efficiently in a packet network. Header suppression allows more voice calls to be established on a particular physical media without the need for explicit compression. This increases call density with relatively low software overhead. Header suppression is implemented on a per link bases within a network and is a layer 2 service offered for transporting layer 3 and layer 4 protocols. Header suppression is applied to any point-to-point or multipoint-to-point network and is particularly useful in transmitting Voice Over IP (VoIP) packets in a cable network.

A first packet processing node transmits packets having multiple packet headers and a packet payload. The first packet processing node while in a header suppression mode suppresses transmission of one or more of the packet headers. A second packet processing node receives the packets from the first packet processing node over a network medium. The second packet processing node includes memory that contains the packet headers suppressed by the first packet processing node and appends the stored headers to the suppressed header packets before sending the packets to a destination endpoint.

In one example, one of the first and second packet processing nodes comprises a cable modem and the other packet processing node comprises a cable modem termination system (headend). A protocol transmits a header suppression notice between the cable modem and the cable modem termination system. Information is then transmitted identifying the headers to be suppressed. The suppressed header information is stored and then appended to suppressed packets. The appended packets are then routed to another endpoint either on the same cable modem network or on a packet-switched network.

While described in a cable modem network environment, header suppression is applicable between any two processing devices that would have the ability to suppress all or portions of one or more packet headers. For example, header suppression can be used between routers or switches. Header suppression can also be used between non-network processing nodes, such as between a backplane and a disc drive.

Cable modems (CMs) include one or more Service Identification (SID) fields for establishing communication channels (microflows) with a Cable Modem Termination System (CMTS) through a cable medium. In another aspect of the invention, a cable modem protocol is used between the CMTS and the CM to dynamically establish and modify multiple microflows between the CMTS and CM on the same cable modem SID.

The cable modem protocol can be initiated by either the CM or the CMTS. A request signal requests modification to the number of phone calls established on one of the SIDs. A response signal is used to indicate acceptance or non-acceptance of the modification request. An acknowledge signal then verifies SID modification and verifies that network bandwidth allocation has been adjusted according to the modification request.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 7C show tables comparing network efficiently of VoIP packets with and without header suppression.

FIG. 8B are diagrams showing how multiple grants are allocated for multiple microflows.

FIG. 8C is a diagram showing how phone calls for multiple microflows are concatenated together.

DETAILED DESCRIPTION

Figure 1:
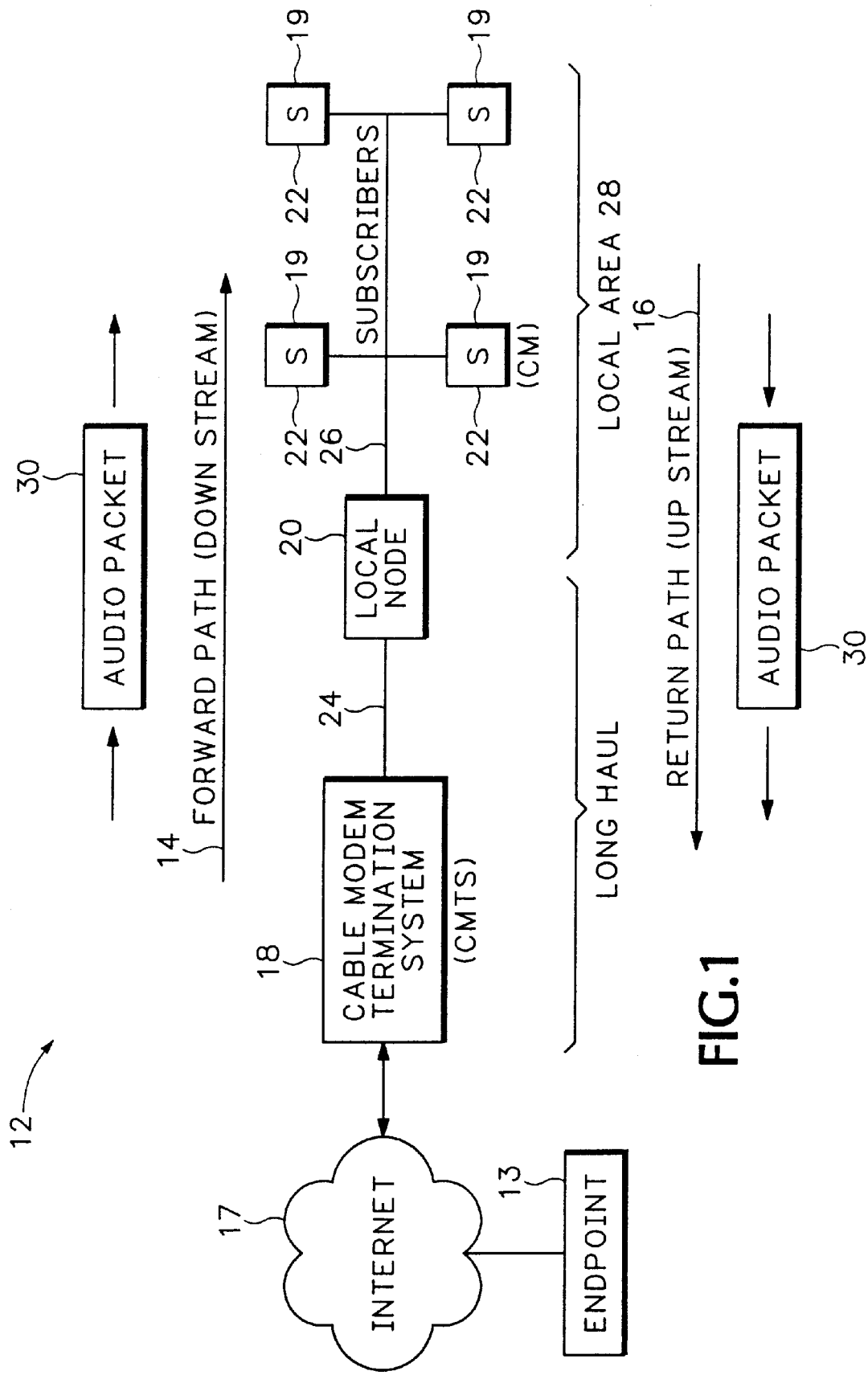
FIG. 1 is a block diagram showing a cable network.

FIG. 1 is a block diagram of a cable modem network 12. A broadcast media includes links 24 and 26 for transmitting audio packets 30 in both a downstream direction 14 and an upstream direction 16. A head-end 18 is alternatively referred to as a Cable Modem Termination System (CMTS). The CMTS 18 includes a computer data manager located at a cable company central location. The CMTS 18 is coupled to endpoints outside cable modem network 12, such as endpoint 13, via the Internet 17. In newer cable installations, the CMTS 18 connects first to a local node 20 over a long haul fiber optic link 24. The local node 20 converts from the fiber optic link 24 to a coaxial cable 26 and distributes cable services to a local area 28 of subscribers 22.

In a dense residential area, the local node 20 might have 2 to 4 main coaxial cable (coax) runs 26 that support a total of 300 to 500 subscribers 22 (homes) within a 1 to 2 mile radius. The local node 20 can support as many as 2500 homes. Less dense areas have fewer homes and a larger radius. The long haul link 24 is typically between zero to 13 miles with a maximum radius of 100 miles. The CMTS 18 typically supports 40 local nodes 20. Each local node 20 has its own unique upstream path 16. Older cable wiring plants do not have local nodes 20 and drive main cable runs directly from the CMTS 18.

The cable modem system 12 is point-to-point, or multipoint-to-point and operates according a data over cable protocol such as the one defined in the Data Over Cable System Interface Specification (DOCSIS). There is at least one Cable Modem (CM) 19 at each subscriber location 22 that communicates with the CMTS 18. In both point-to-point and multipoint-to-point, there is only one receiver on the media, such as CMTS 18, that communicates with one or more CMs 19.

Voice traffic is transferred by scheduling dedicated grants. A map is built that describes which CMs 19 get to transmit and for how long. The maps are sent to the CMs 19. When a CM 19 is allocated an associated grant, voice traffic is sent upstream to the CMTS 18. The links between CMTs 18 and CMs 19 are identified in the maps using the DOCSIS Service Identification (SID) field.

It should be understood that the terms, voice, audio, voice traffic, voice data, data, etc. are all used interchangeably to describe information transmitted between two endpoints. For illustrative purposes, the invention is described with respect to a cable modem network used among other things to transmit telephone calls. However, the invention can be used with any packet processing device to improve bandwidth efficiency.

Figure 2:
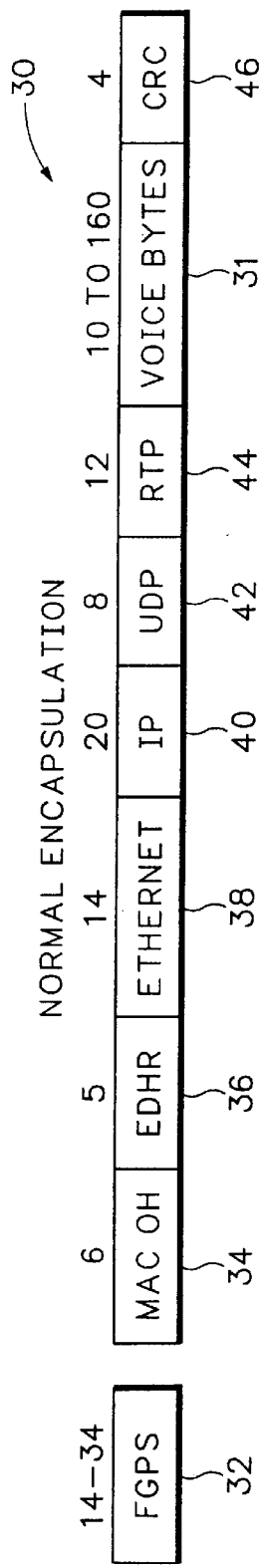
FIG. 2 is diagram showing encapsulation for Voice over IP data in a cable modem system.

FIG. 2 shows a standard prior art encapsulation for the audio packets 30 used in DOCSIS for transmitting a voice payload 31. The packet encapsulation 30 includes a DOCSIS Physical (PHY) overhead 32 of typically 14 to 34 bytes. The PHY overhead may vary and can include FEC, guard time, preamble, and stuffing bits. MAC overhead 34 is typically 6 bytes and a DOCSIS baseline Privacy Extended Header 36 is typically 5 bytes. Headers 34 and 36 are referred to generally as a cable header.

The audio packet 30 also includes a 14 byte Ethernet header 38 and a 4 byte Cyclic Redundancy Code (CRC) 46. The remaining overhead in audio packet 30 is used for packet transmission over the Internet 17 (FIG. 1) and includes a 20 byte IP header 40, an 8 byte User Datagram Protocol (UDP) header 42 and a 12 byte Real-Time Transport Protocol (RTP) header 44.

The size of the audio payload 31 varies depending on the amount of audio data transmitted in the packet 30 and the codec used to compress the audio data. Using a G.711 codec and 20 ms of audio data, the voice payload 31 is 160 bytes. Using a G.729 codec and 10 ms of audio data, the voice payload 31 is only 10 bytes.

Figure 3:
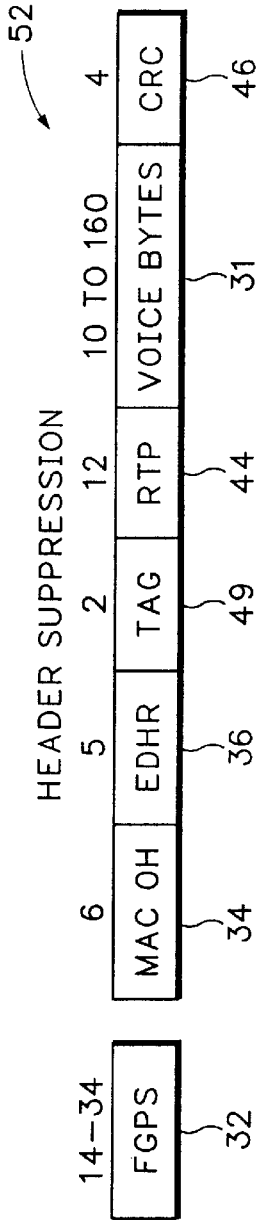
FIG. 3 is a diagram showing header suppression according to the invention for Voice over IP data in a cable modem system.

FIG. 3 shows a suppressed header packet encapsulation 52 according to one aspect of the invention. The Ethernet header 38 (except for the CRC 46), the UDP header 42, and the IP header 40 are all suppressed. This results in the packet encapsulation 52 with the following:

DOCSIS PHY overhead 32 (14 to 34 bytes)

Cable headers 34, 36 (11 bytes)

Ethernet CRC 46 (4 bytes)

TAG field 49 (2 bytes)

RTP header 44 (12 bytes)

Voice payload 31 (variable)

The savings in overhead is from the 14 byte Ethernet Header 38, 20 byte IP header 40, and 8 byte UDP header 42 totals 42 bytes. One or more of these headers or portions of one of more of the headers can be suppressed.

DOCSIS includes a baseline privacy (BPI) encryption scheme. When BPI is enabled, encryption begins after the first 12 bytes of the packet. With the Ethernet header 38 suppressed, the RTP header 44 is sent in the clear but the voice will be encrypted. Once a flow is established, the Ethernet source address, destination address, and type field all remain constant. For fixed length packets, the length also remains constant. Thus, all these fields may be suppressed.

The IP header includes the IP source and IP destination address and identifies that IP flow. The IP and UDP headers remain the same during the DOCSIS connection between CMTS 18 and CM 19. Since the call flow is unique and identifiable, the IP and UDP header may be suppressed at the sending end of the connection and then reattached at the receiving end of the connection.

This header information is sent up to the receiving end of the connection as part of the call setup phase, and is indexed with the connection using either the RTP Synchronizing Source (SSRC) field, the DOCSIS Service Identification (SID) field located in the DOCSIS header, a tag field 49 or some combination thereof. The receiving end of the connection uses the index to identify what previously stored bytes should be appended to the suppressed header packets.

In one example, Header Suppression uses the SSRC field in the RTP header as an index to identify flows having header suppression. RTP is one example, of a payload that can utilize header suppression. As mentioned above, the tag field 49 or other fields in the suppressed header packet 52 can alternatively be used as an index to locate suppressed headers that have been stored in memory.

Figure 4A:
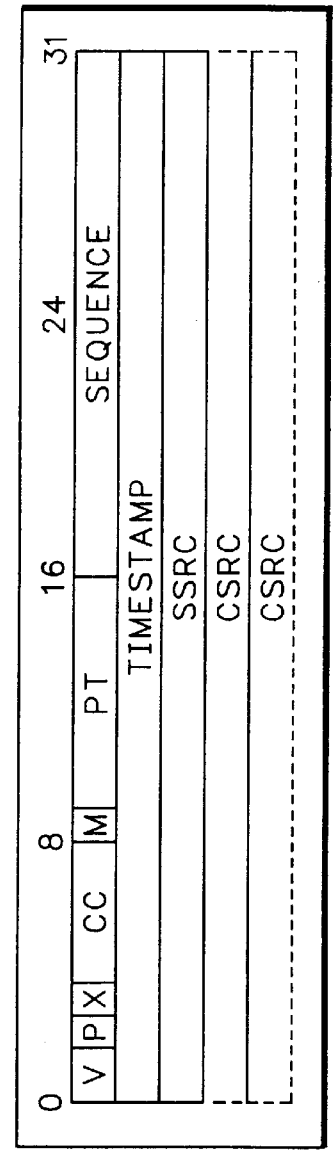
FIG. 4A is a detailed diagram of an RTP header used for indexing flows with header suppression.

The entire RTP header is shown in FIG. 4A. RTP and RTCP are described in general in RFC-1889, RTP: A Transport Protocol for Real-Time Applications, Audio-Video Transport Working Group, H. Schulzrinne, S. Casner, R. Frederick & V. Jacobson. January 1996. Use of RTP for voice is described in RFC-1990, RTP Profile for Audio and Video Conferences with Minimal Control, Audio-Video Transport Working Group, H. Schulzrinne, January 1996

The fields in the RTP header include the following:
V Version. Set to 2 for RFC-1889.
P Padding bit. Indicates that the payload has padding octets.
X Extension bit. If set, there is an extended header
CC The number of CCRC fields included
M Marker bit. The marker bit is application dependent. For VAD, the first packet of a talk spurt has this bit set.
PT Payload Type. For example,
   0: G.711, u-Law
   8: G.711, a-Law
   9: G.722
   15: G.728
Sequence Packet sequence number
Time Stamp Indication of real time in time unit related to the Payload type.
SSRC Synchronizing Source. Random number unique per host.
CSRC Contributing Source. Optional. Lists contributors when mixing streams.

By utilizing the SSRC number associated with the source, the CMs can be uniquely identified for attaching suppressed headers.

Figure 4B:
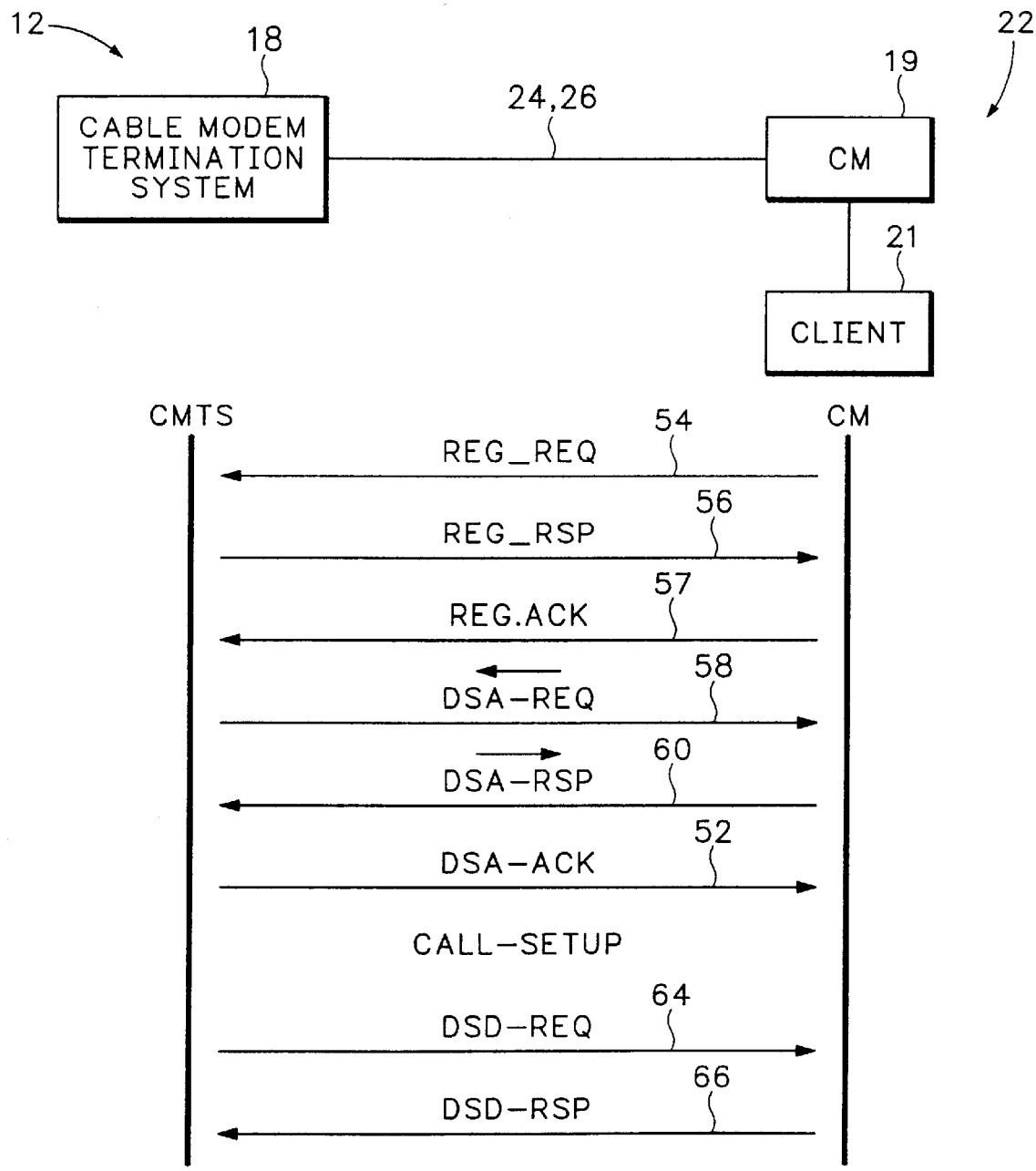
FIG. 4B is a call setup connection diagram used for establishing header suppression.

FIG. 4B is a simplified drawing of the cable network 12 previously shown in FIG. 1 along with an associated connection diagram. The CMTS 18 establishes a connection with a client 21 via the cable modem 19 at one of the subscriber locations 22. Each connection between the CMTS 18 and CM 19 is setup using a DOCSIS signaling protocol. The signaling protocol establishes a unique IP flow with each connection. The connection diagram in FIG. 4A shows a connection initiated by the CMTS 18 but the connection can be initiated either by the CMTS 18 or one of the CMs 19. The handshaking described below is simply reversed when the CM 19 initiates the connection.

DOCSIS signaling starts with an initial registration request (REG-REQ) 54. A registration response is sent back (REG-RSP) 56 and acknowledged with a registration acknowledge (REG-ACK) 57. When a phone call is added to the cable network 12, a Dynamic Service Addition request (DSA-REQ) 58 is sent. This is responded to with a DSA response (DSA-RSP) 60. A DSA acknowledge signal (DSA-ACK) 62 is then sent back. The call is then set up between the CMTS 18 and the CM 19. The call is terminated by sending a Dynamic Service Deletion.request (DSD-REQ) or DSC-REQ 64. DSC signaling is described below in FIG. 9. A response is returned by sending a DSD response (DSD-RSP) or DSC-RSP 66.

During registration, if Header Suppression is supported, the correct values are set in a Modem Capability Field. When the DSA-REQ or DSC-REQ is initiated, if Header Suppression is supported, the Header Suppression Configuration settings are included. The DSA-RSP or DSC-RSP accepts or rejects the request and the DSA-ACK or DSC-ACK is sent as an acknowledgement.

Figure 5:
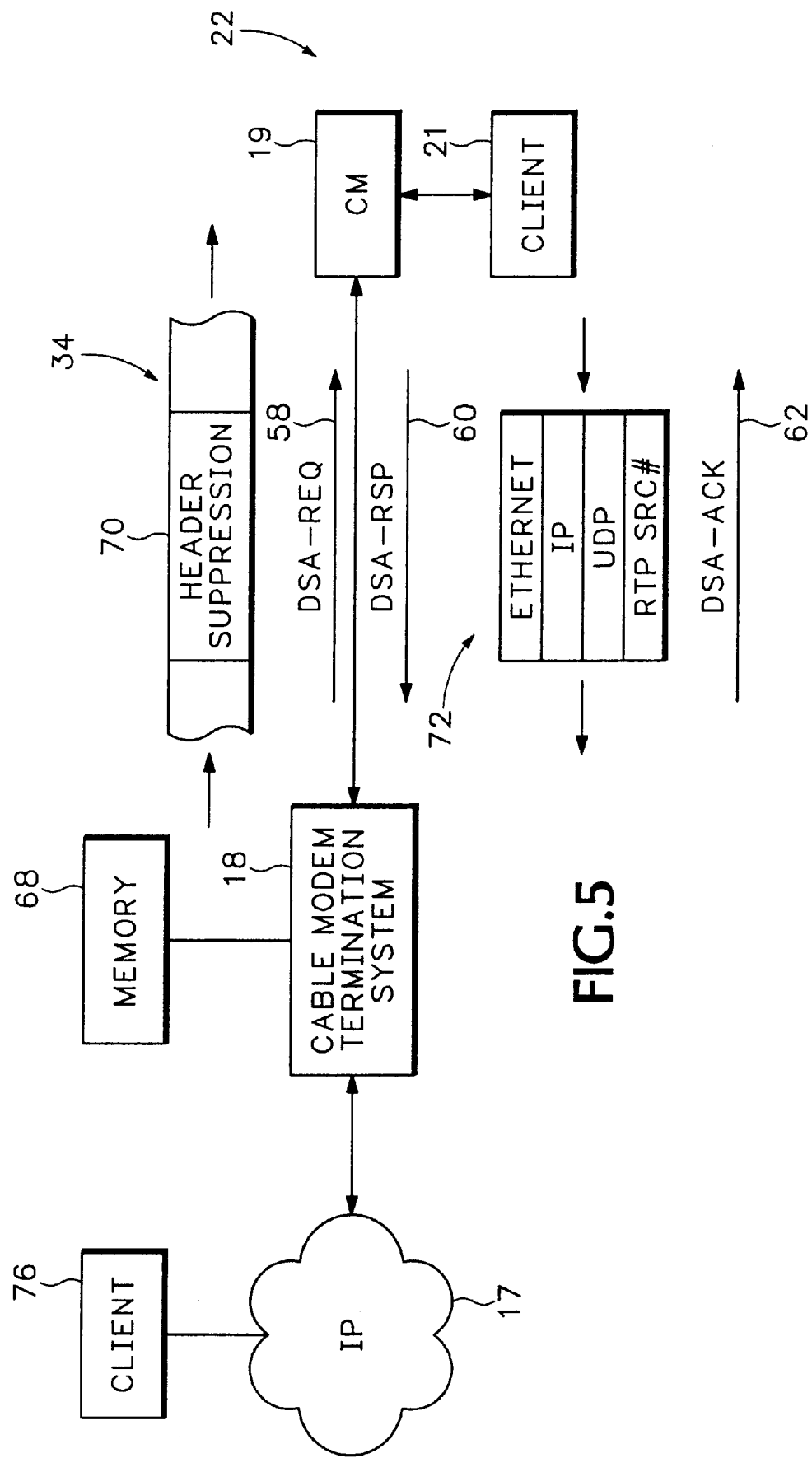
FIG. 5 is a block diagram showing how header suppression is initialized.

Referring to FIG. 5, the CMTS 18 includes memory 68 that stores information for the suppressed headers. The REG-REQ 54 includes a DOCSIS header 34 that contains a modem capability field 70. A header suppression extension is added to the DSA-REQ 58 to initiate header suppression at the CM 19. The DSA-RSP 60 response from CM 19 includes an extension 72. The extension 72 includes the Ethernet address, Internet address, UDP address and RTP source number for the call between a client 21 and another client 76. Every phone call has a separate call setup and tear down as shown in FIG. 5.

Once an RTP flow has been established between the CM 19 and the CMTS 18, the Ethernet, UDP, and IP headers remain the same for the duration of that flow. DOCSIS Header Suppression suppresses these headers at the CM 19 and use DOCSIS signaling to cache and then restore the headers at the CMTS 18.

This technique is different than Compressed RTP (CRTP). CRTP only sends changes associated with the IP/UDP/RTP header. Header suppression suppresses the headers where CRTP compresses the headers. Header Suppression is also less CPU intensive and uses the Ethernet/IP/UDP headers where CRTP uses the IP/UDP/RTP headers. Header Suppression results in a Constant Bit Rate (CBR) flow where CRTP results in a Variable Bit Rate (VBR) flow.

Figure 6:
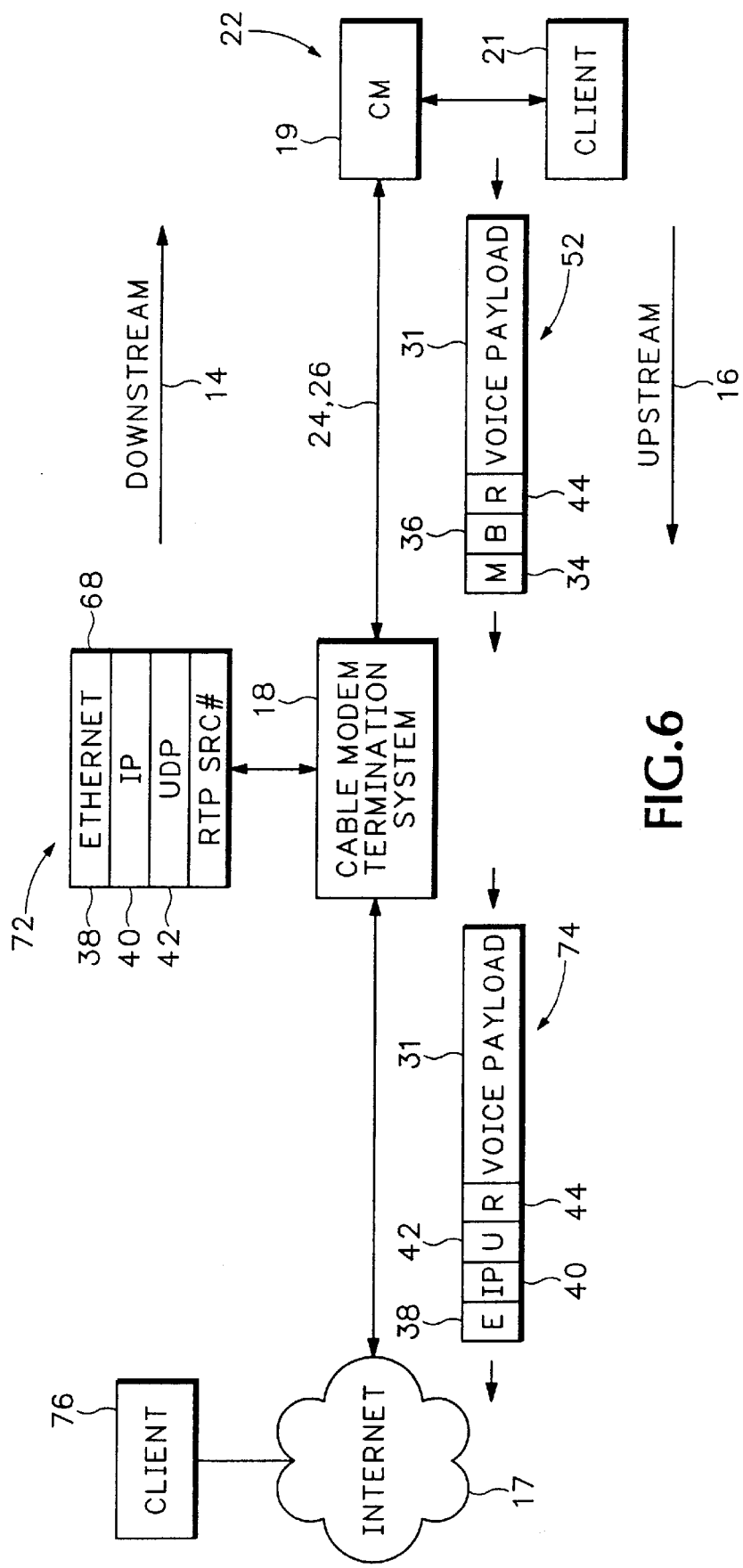
FIG. 6 is a block diagram showing how header suppression is performed according to the invention.

Referring to FIG. 6, the extension 72 is loaded into memory 68 in CMTS 18. The CM 19 suppresses the headers 38, 40 and 42 in audio packets 52 sent to CMTS 18. When the packets 52 are received at the CMTS 18, the Ethernet header 38, IP header 40 and UDP header 42 are appended to the audio packet 52. The appended audio packets 74 are then transmitted to the client 76 over the Internet 17. The Ethernet header 38 may be eventually stripped off and replaced if the packet is transmitted over the Internet 17.

The RTP header 44 can be further compressed using industry standard approaches to RTP compression. This further increases network efficiency. However, RTP compression techniques usually result in variable payload sizes, especially when there is a packet drop and a resynchronization. In a point-to-multipoint network such as the DOCSIS downstream path 14, the Ethernet header 38 is used for address filtering, and cannot be fully eliminated. However, the IP/UDP header could still be suppressed and restored.

Figure 7A:
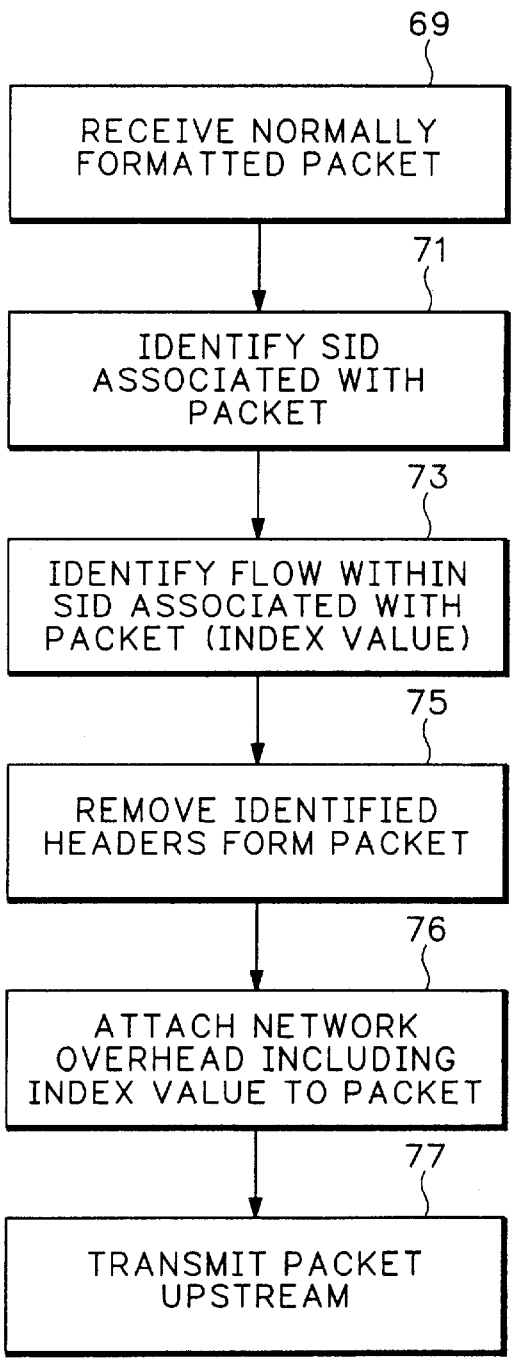
FIG. 7A is a flow diagram showing how header suppression is conducted at a packet processing node transmitting suppressed header packets.

FIG. 7A is a flow diagram showing how header suppression is conducted at the packet processing node transmitting the suppressed header packets, for example, at the CM. A normally formatted packet is received in step 69. The SID associated with the packet is identified in step 71. Typically, the IP addressing associated with the packet is used to identify the SID. A particular index value identifying a flow within the SID is identified in step 73.

The headers previously identified for suppression are removed in step 75. The cable modem network overhead is then attached to the stripped packets. For example, in a cable modem network, the Multimedia Cable Network System (MCNS) overhead is attached to the stripped packet. This overhead includes the index field that identifies the flow. The index may be in the form of the RTP SSRC field or the TAG field. The packet is then transmitted to the receiving packet processing node in step 77.

Figure 7B:
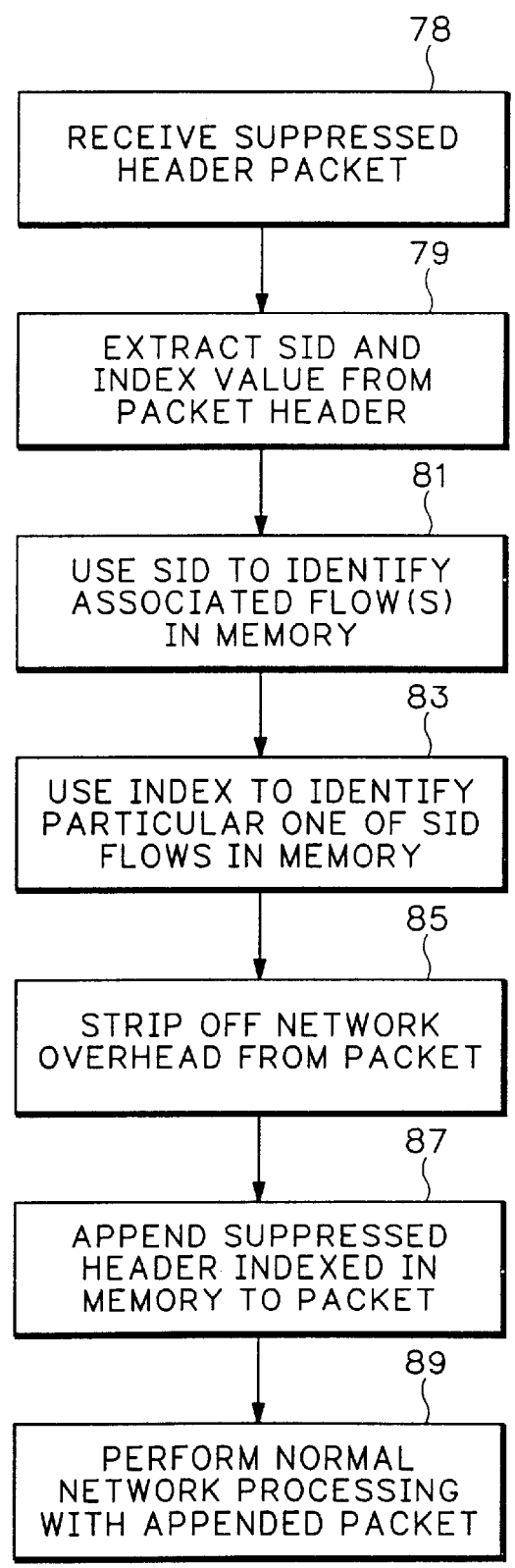
FIG. 7B is a flow diagram showing how header suppression is conducted at a packet processing node receiving suppressed header packets.

FIG. 7B is a flow diagram showing how header suppression is conducted at the receiving packet processing node, for example, at the CMTS. The suppressed header packet is received in step 78. The SID and index value are extracted from the suppressed header packet in step 79. The SID value is used in step 81 to identify locations in memory storing information on associated SID flows. The index value is then used in step 83 to access a memory location for a particular one of the flows associated with the SID. The indexed memory location contains the header information for the suppressed header packet.

The remaining network overhead on the suppressed header packet is stripped off in step 85. For example, the MCNS overhead and tag field (if applicable) are removed. The header information indexed in memory is appended to the packet in step 87 and the packet processed as a normal network packet in step 89.

Connection Density Comparison

The tables in FIG. 7C analyze how many voice connections can be made on the DOCSIS upstream path 16 (FIG. 6). The equivalent raw bit rates used are:

QPSK at 1280 thousand-samples per second (ksps) and 2.56 Mbps

16 QAM, 2560 ksps: 10.24 Mbps

These calculations make the following assumptions for sake of comparison:

10% for FEC overhead in the PHY

Guard Time and Preamble allowed for

No Silence Suppression. Silence suppression could increase connections by 50%.

No data traffic. All traffic is voice.

No allowance for Req/Maintenance slots (<1% overhead).

The voice sample lengths are varied between 20 ms and 10 ms, and the encoding rate varied between 64, 16, and 8 kbps. Adding up the number of bytes in each encapsulation scheme, adding the PHY overhead, and dividing into the available bandwidth arrives at the number of connections. Tables in FIG. 7C show three of many possible sample periods and bit rates that would benefit from header suppression.

The call density for a conservative, QPSK, 1280 ksps, 1.6 MHz, 2.5 Mbps upstream channel with G.711 (64 kbps) encoding, no VAD, is 24 calls. This is comprarable to a T1 link which can also handle 24 calls and has a data rate of 1.544 Mbps. The DOCSIS upstream, however, is many times more flexible and reconfigurable than a standard T1 link.

Header compression increases call density 20% for large packets (G.711, 20 ms) to 90% for small packets (G.729, 10 ms). 8:1 voice compression (G.711:G.729) results in a call density increase between 1.7 (10 ms, no header suppression) to 3.4 (20 ms, header suppression). Doubling the symbol rate doubles the call density. Going from QPSK to 16QAM doubles the call density.

Header suppression provides several clear advantages. First, header suppression is more bandwidth efficient, ranging from at least 20% to 133%, depending upon the size of the voice sample. Header suppression is also simple to implement. It is not computationally intense so a significant number of CPU clock cycles are not consumed. A header attachment function is already provided by the first network processing node and therefore does not require substantial coding upgrades.

The resulting packet size resulting from header suppression is also constant. This is very important for Constant Bit Rate (CBR) systems. In a CBR system, bandwidth must be reserved for the worst case packet size. If a packet varies in size due to standard compression, the value of the compression is lost if the bandwidth reservation is based upon the worst case packet size which may be the original packet size. Header suppression eliminates this problem by reducing the packet to both a smaller and constant size.

Header suppression is applicable to any network and is adaptable to different network links other than as shown in cable networks. For example, header suppression can be used between any two routers as long as packets. between the two routers are uniquely identified through a scheduling protocol, such as RTP, DSL, ATM, wireless, etc.

Multiple Microflows per SID

Figure 8A:
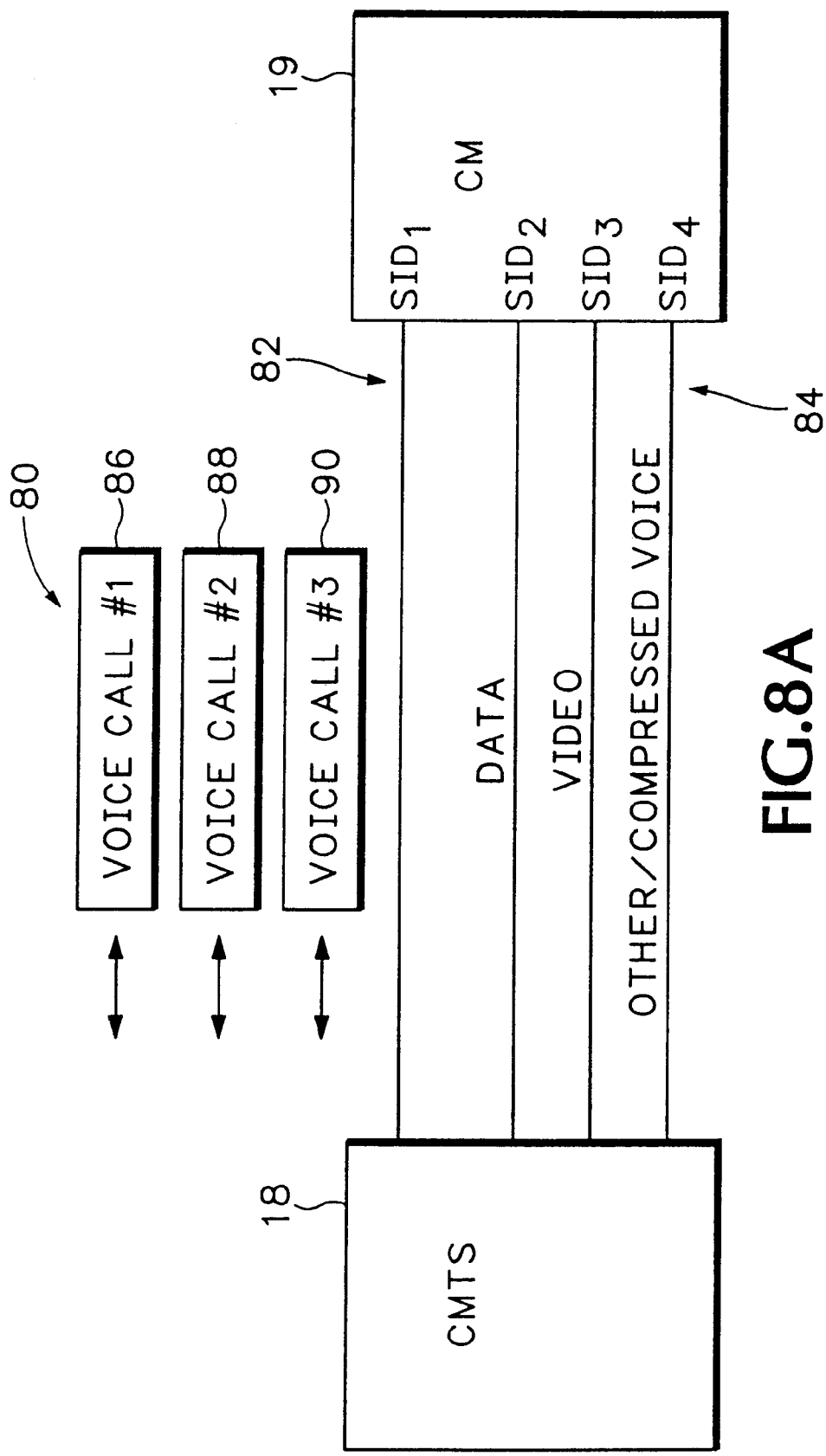
FIG. 8A is a diagram of a cable modem network having multiple microflows per Service Identification (SID) field according to another aspect of the invention.

Referring to FIG. 8A, the CM 19 has at least one primary SID 82. The CM 19 may have additional SIDs 84. Each SID will have one service class and a packet classification table which specifies a Layer 2/3 flow. Another aspect of the invention allows the layer 2/3 flow to have multiple microflows within it. The SID 82 is an example of a SID having multiple microflows 80 comprising voice calls 86, 88 and 90. Other types of data traffic could also traverse SID 82.

Microflows are added to a SID and removed from a SID using the Dynamic Service Addition (DSA) or the Dynamic Service Change (DSC) commands. Microflows are specified using a Packet Classification Parameter. When microflows are added or deleted, flow scheduling parameters may be renegotiated. For Best Effort, Real Time Polling Service, Non Real Time Polling Service, and Committed Information Rate scheduling algorithms, all final Flow Scheduling parameters are applied independently of the number of microflows.

Unsolicited Grant Service (UGS) is an exception. The UGS will have a nominal interval, for example, 10 milliseconds. If there is one microflow on the CM SID, one grant will occur per interval. If there are n microflows per SID, then the microflows may be sent either by multiple grants per interval, or by concatenation of multiple microflows per grant. The best scheduling flexibility is usually achieved with multiple grants per interval.

When there are multiple phone calls carried over the same SID, the RTP SSRC number (FIG. 4A) or TAG field is used to uniquely identify each phone call. Other operations, such as header suppression, can also be performed for multiple phone calls on the same SID. Using the SSRC number or TAG field also allows quicker and more simple phone call lookups.

FIG. 8B shows two timing diagrams 91 and 92 representing grants 93 occurring over time. The grants actually comprise entries in a map table local to the CM. The UGS may have a nominal interval of, for example, 10 milliseconds (MS). Microflows or channels are established on the same SID for telephone calls or other data. If there is one microflow on the SID, one grant 93 is allocated per interval 95 as represented by timing diagram 91. If there are 3 microflows per SID, then the three microflows are allocated three grants 93 per 10 ms interval 95 as represented by timing diagram 92. Alternatively, packets in the three microflows are concatenated and all sent together for each grant allocation as shown in FIG. 8C.

The grants 93 may appear at any time within the interval and may even be adjacent. There is no direct association of microflow per grant within a SID as there is no sub-addressing mechanism within a SID. If the service class for a SID calls out best effort data, then all microflows are best effort data. If the service class calls out G.711, 20 ms VoIP traffic, all microflows are G.711, 20 ms VoIP.

Dynamic Service Change

The Dynamic Service Change (DSC) set of messages is used to modify the flow parameters associated with SIDs. Specifically, DSC can:

Modify the flow specifications
Add, Modify, or Delete a Flow Classification Rule To prevent packet loss, any required bandwidth change is sequenced between the CM 19 and the CMTS 18. If the SID bandwidth is to be reduced, the CM 19 reduces its payload bandwidth first, and then the CMTS 18 reduces the bandwidth scheduled for the SID. If the SID bandwidth is to be increased, the CMTS 18 increases the bandwidth scheduled for the SID first, and then the CM 19 increases its payload bandwidth.

CM Initiated Dynamic Service Change

Figure 9:
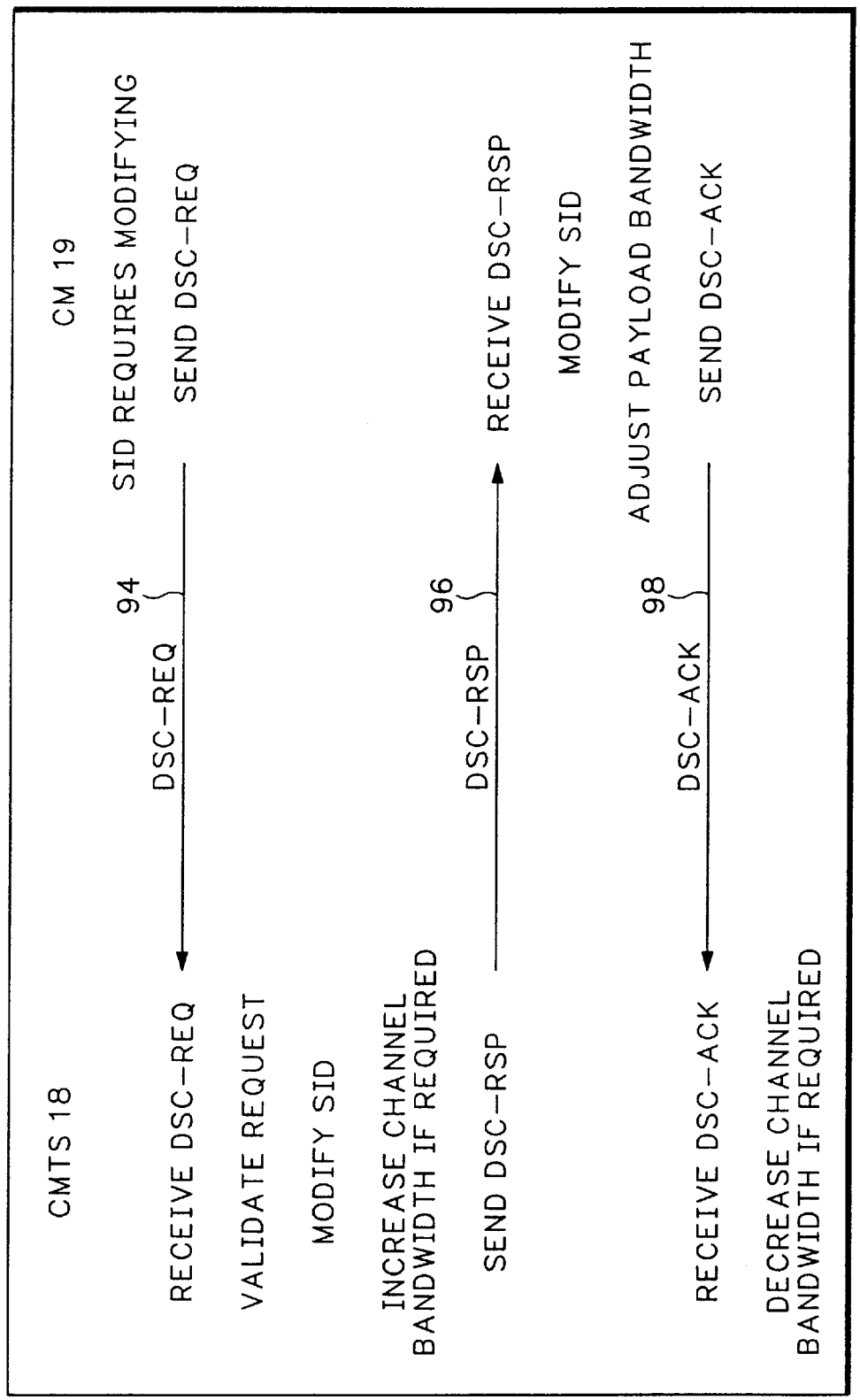
FIG. 9 is a cable modem initiated Dynamic Service Change (DSC) diagram.

Referring to FIG. 9, if CM 19 wishes to add or remove a microflow from an existing SID, a request 94 is made to the CMTS 18 with a Dynamic Service Change Request (DSC-REQ). If the CM 19 requests with a DSA-REQ (FIG. 4), the microflow is supported with a new SID. The CMTS 18 checks the authorization of the CM 19 for the requested class of service and whether the Quality of Service (QOS) requirements can be supported on that requested SID.

If the CMTS 18 decides that the referenced SID cannot support the addition of this microflow, then the CMTS 18 denies the request. If the CMTS 18 decides that the referenced SID can support the additional microflow, then the CMTS 18 accepts the request. The CMTS 18 generates a response 96 using a Dynamic Service Change Response (DSC-RSP). When the SID is successfully reconfigured, CM 19 generates a Dynamic Service Change Acknowledge (DSC-ACK) signal 98.

Figure 10:
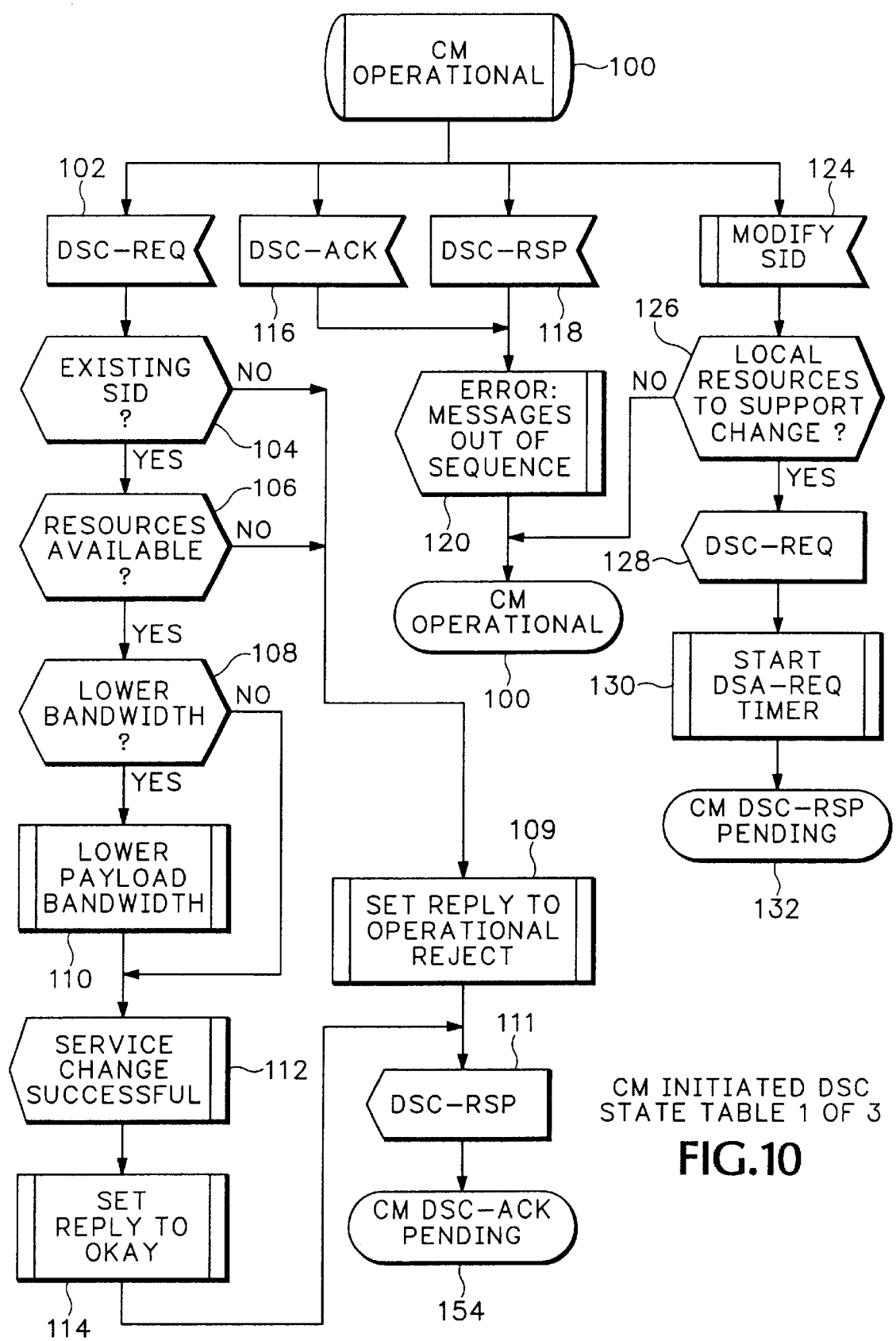
FIGS. 10–12 are CM initiated DSC state diagrams.
Figure 11:
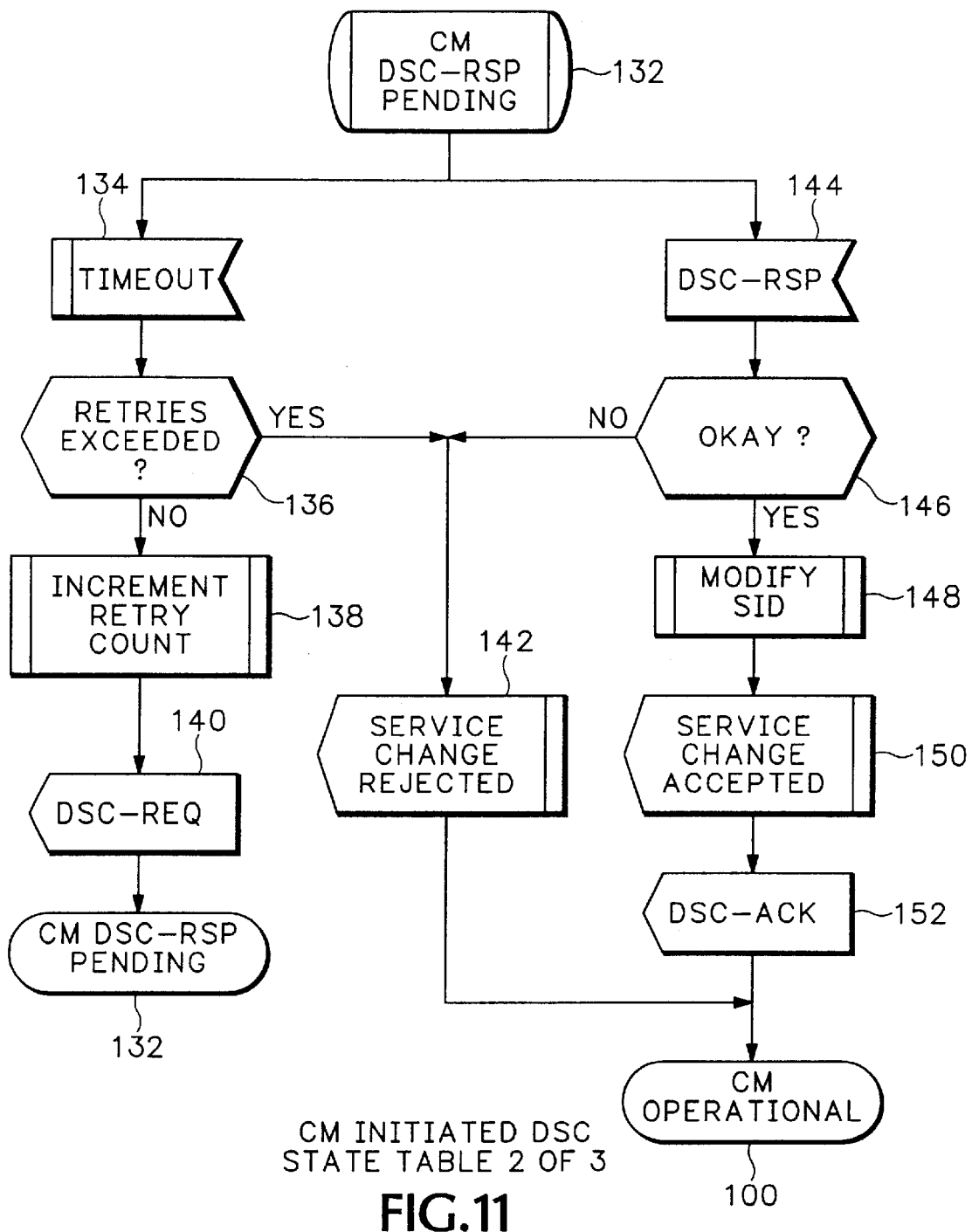
Figure 12:
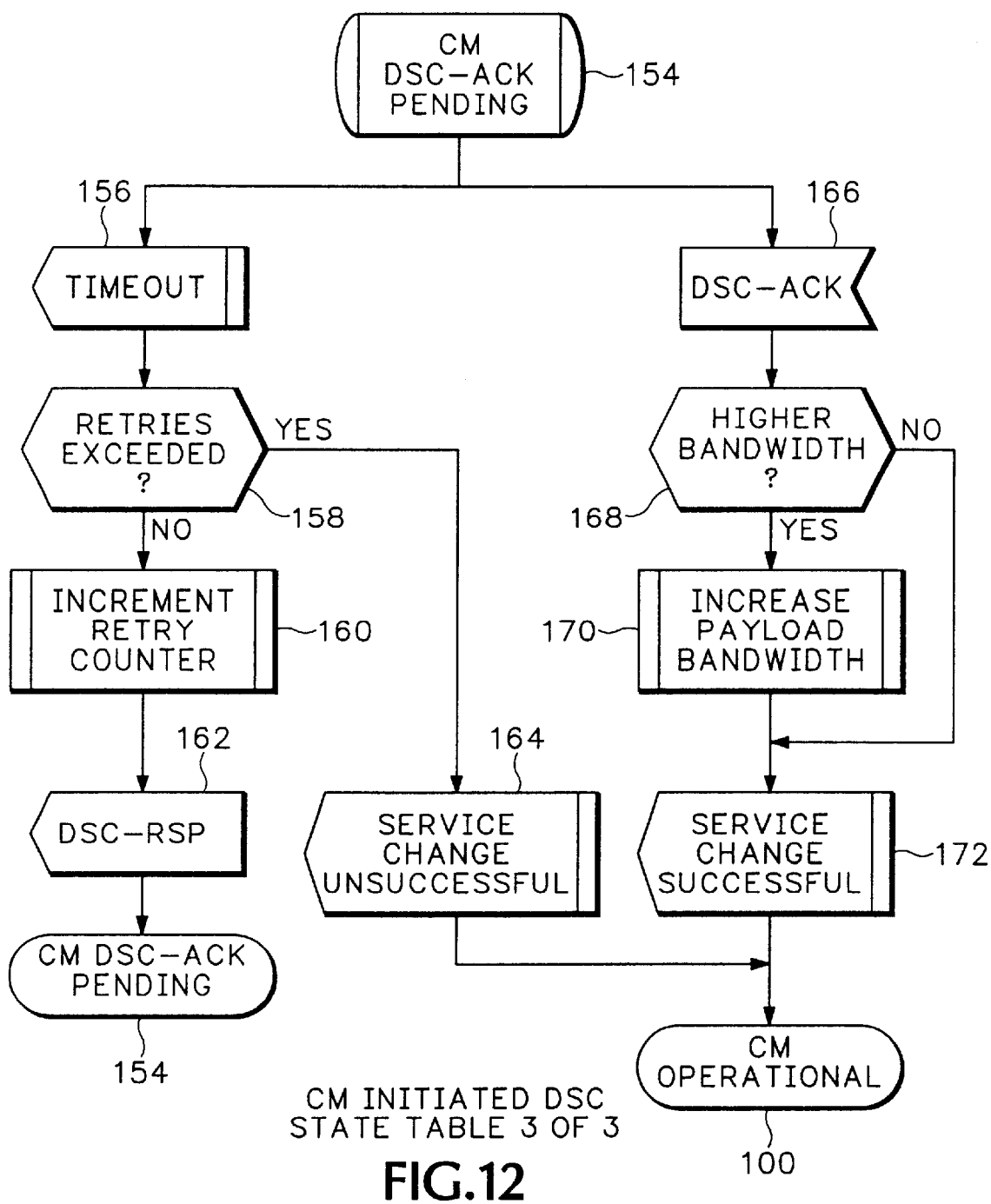

FIGS. 10–12 are state tables showing in detail a CM initiated Dynamic Service Change. The CM is initially in an operational state 100. An externally received DSC-ACK in state 116 or DSC-RSP in state 118 is out of sequence and generates an internal error message in state 120. The CM then goes back into CM operational state 100.

If an internal modify is received in state 124, the CM determines in state 126 if local resources can support the change. If not, the CM goes back to CM operational state 100. If the SID modification can be supported, a DSC-REQ is sent to the CMTS in state 128. A DSA-REQ timer is then started in state 130 and the CM moves to a DSC-RSP pending state 132.

Referring to FIG. 11, if the DSA-REQ timer times out, in state 134, the number of retries are checked in state 136. If the number of retries has exceeded some preset number, the service change is rejected in state 142. The CM then goes back into the CM operational state 100. If there is a timeout in state 134 and the number of retries is not exceeded in state 136, a retry counter is incremented in state 138 and another DSC-REQ is sent in state 140. The CM then goes back into the DSC-RSP pending state 132.

If a DSC-RSP is received before the timeout in state i44, the DSC-RSP indicates whether the request is OK in state 146. If the modify SID request is not OK in state 146, the service change is rejected in state 142. If the modify SID request is accepted by the CMTS, the SID is modified in state 148 and the service change indicated as accepted in state 150. The CM then sends a DSC-ACK in state 152 and goes back into the CM operational state 100.

Referring back to FIG. 10, when an external DSC-REQ is received in state 102, it is first determined whether the DSC-REQ references an existing SID in state 104. If not, the CM reply is set to an operational reject in state 109. If the DSC-REQ references an existing SID but resources are not available in state 106, the reply is also set to an operational reject in state 109. If resources are available and lower bandwidth is requested in state 108, the payload bandwidth is lowered in state 110. If lower bandwidth is not requested or after the CM has lowered the payload bandwidth in state 110, the service change is indicated as successful in state 112 and the reply set to OK in state 114. A DSC-RSP is then sent with the reply in state 111 and the CM moves into a CM DSC-ACK pending state 154.

Referring to FIG. 12, the CM waits for an acknowledge in state 154. If a timeout occurs and a preset number of retries is exceeded in state 158, the service change is indicated as unsuccessful in state 164. If the number of retries is not exceeded, the retry counter is incremented in state 160 and another DSC-RSP sent in state 162. The CM then goes back into the DSC-ACK pending state 154.

If a DSC-ACK is received in state 166 and a higher bandwidth was requested in state 168, payload bandwidth is increased in state 170. The service change is identified as successful in state 172 and the CM moves back into CM operational state 100.

CMTS Initiated Dynamic Service Change

Figure 13:
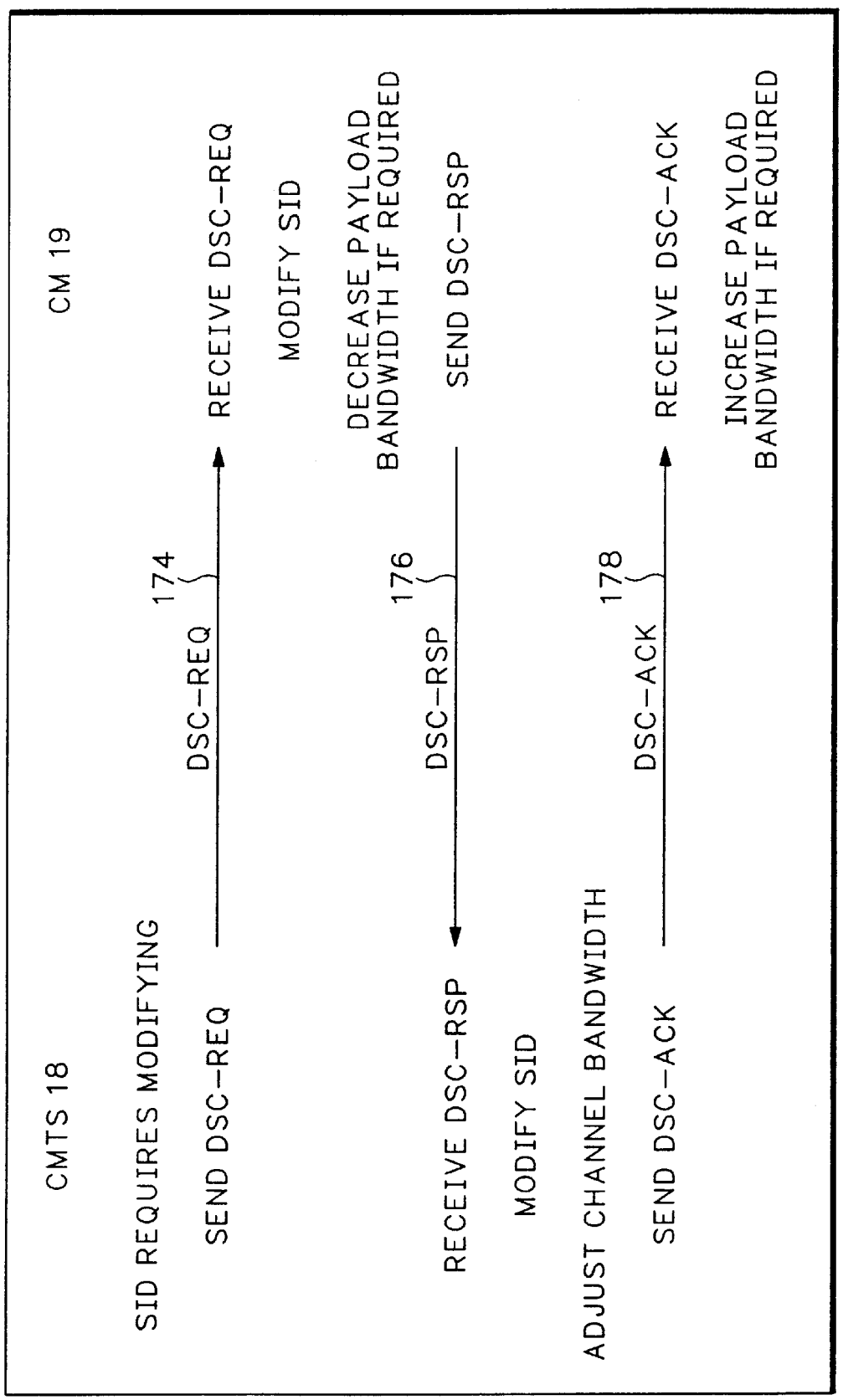
FIG. 13 is a Cable Modem Termination System (CMTS) initiated DSC diagram.

FIG. 13 shows the operations performed when the CMTS wishes to change a dynamic service class to a CM. The CMTS checks the authorization of the destination CM for the requested class of service and whether the QOS requirements can be supported. The CMTS analyzes the flow parameters and decides whether to add the flow to an existing SID or whether to issue a new SID. If an existing SID is to be modified, the CMTS informs the CM, using a DSC-REQ 174. The CM determines whether it can support the service change, and responds using DSC-RSP 176. The CMTS modifies the SID as necessary and, if appropriate, adjusts channel bandwidth. The CMTS then sends an acknowledgement with a DSC-ACK 178. The CM receives the DSC-ACK and, if required, increases payload bandwidth.

Figure 14:
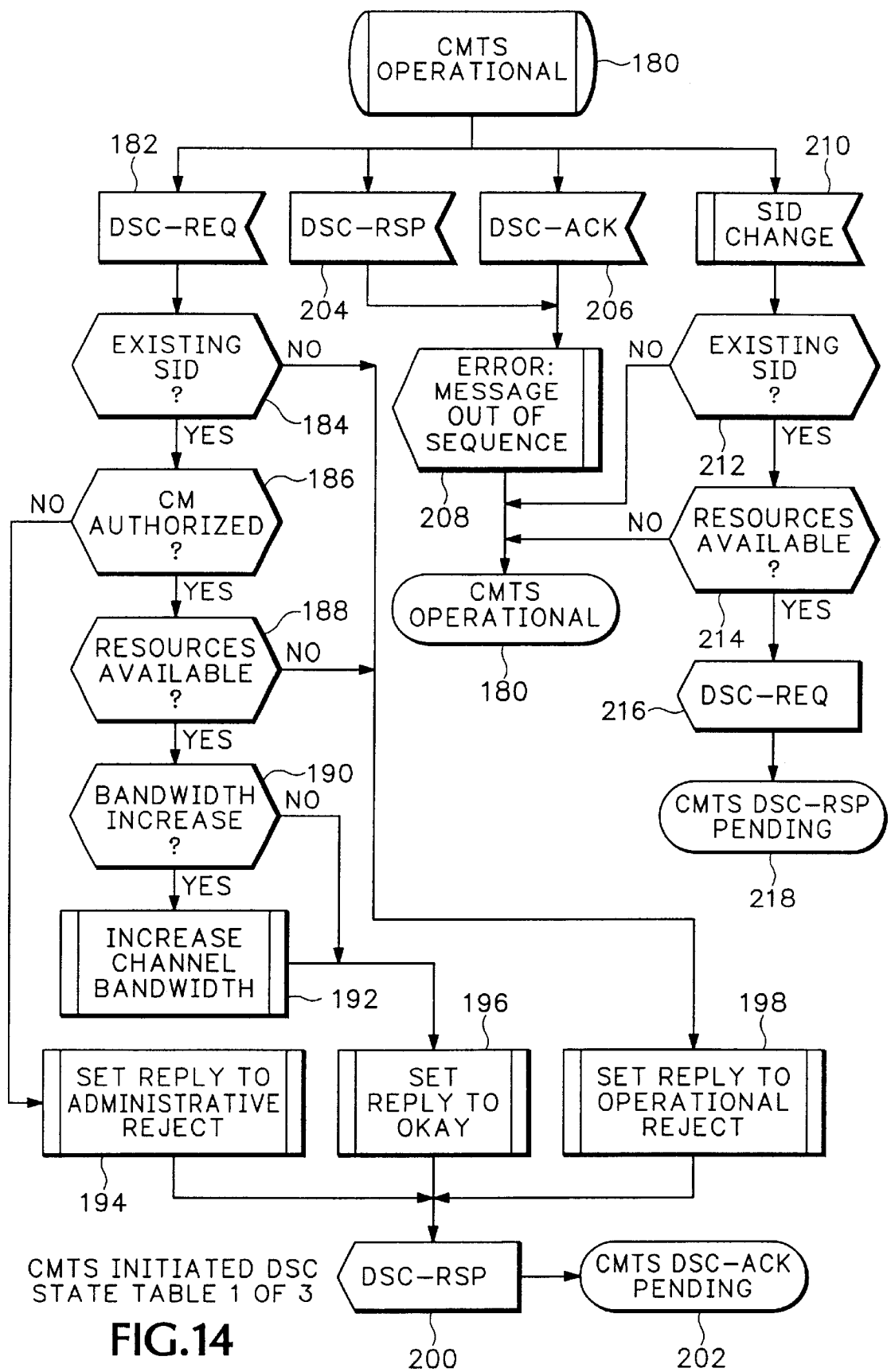
FIGS. 14–16 are CMTS initiated DSC state diagrams.
Figure 15:
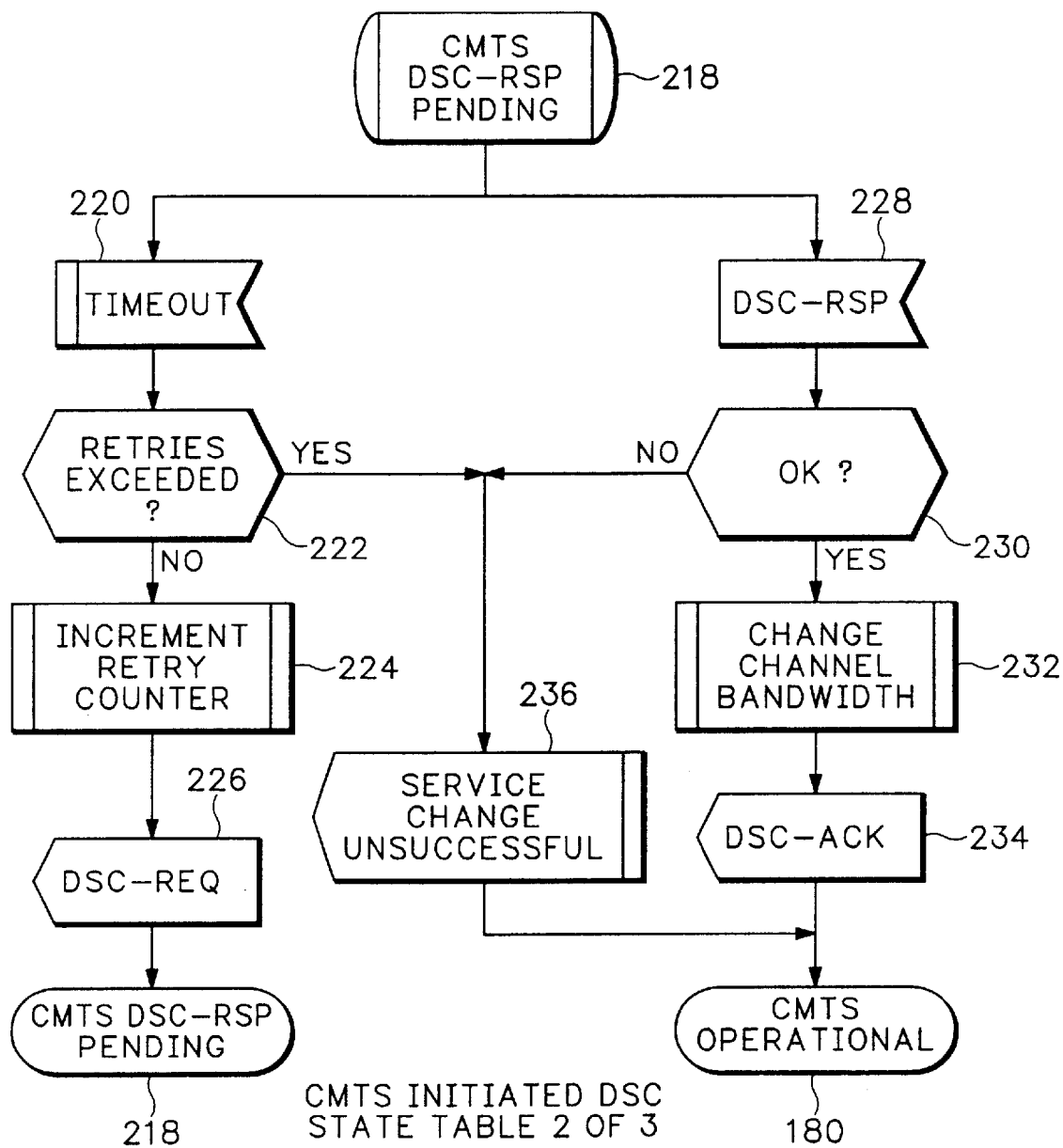
Figure 16:
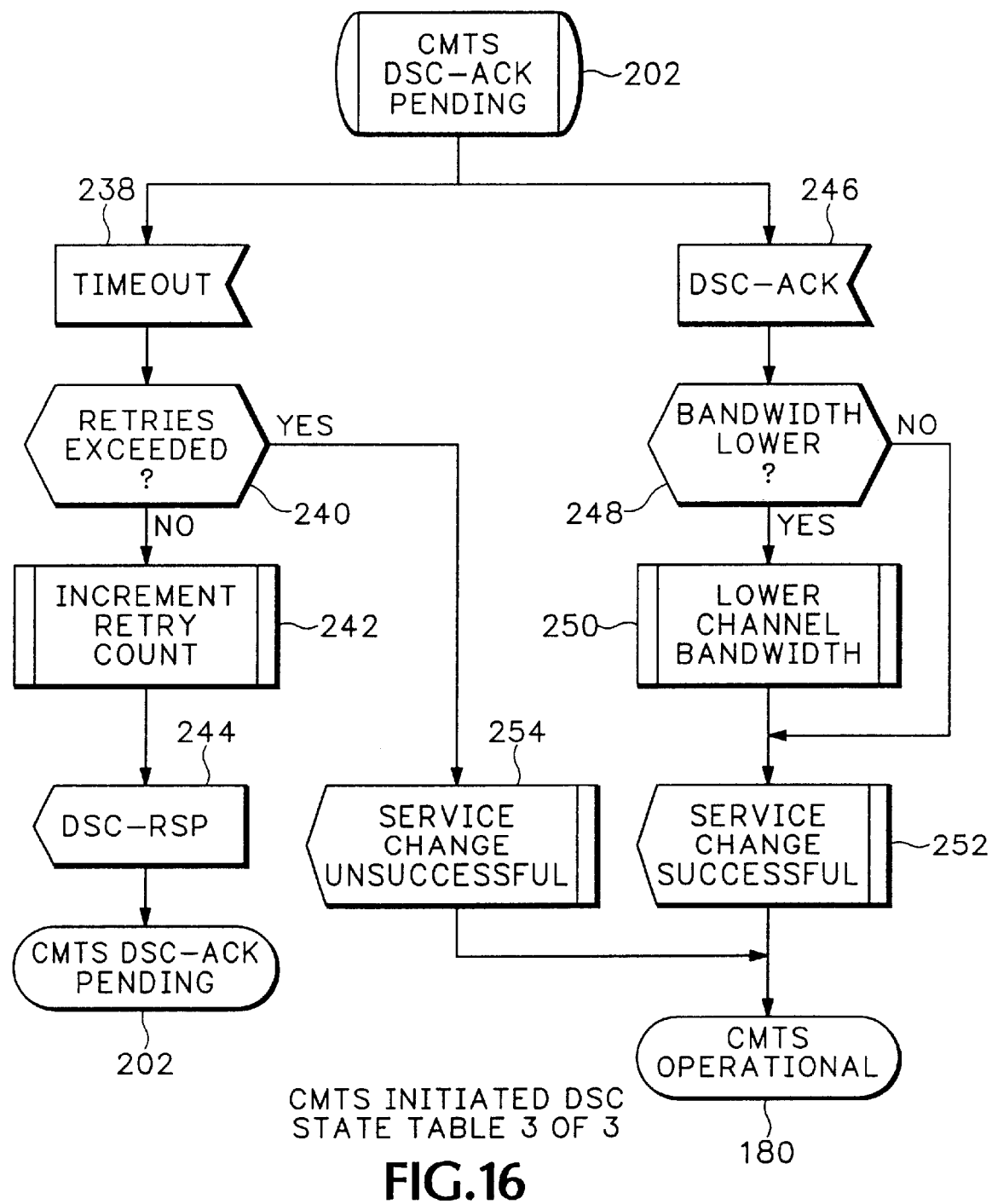

FIGS. 14–16 show a detailed state table of the CMTS initiated DSC messages. Referring to FIG. 14, the CMTS begins in an operational state 180. If a DSC-RSP is received in state 204 or a DSC-ACK received in state 206, an out of sequence error message is generated in state 208. The CMTS than moves back to operational state 180. For a SID change request in state 210, it is verified that the referenced SID exists in state 212. If the SID does not exist or the requested resources are not available in state 214, the CMTS goes back to CMTS operational state 180. If the SID does exist and the resources are available, a DSC-REQ is sent to the appropriate CM in state 216. The CMTS then goes into a DSC-RSP pending state 218.

Referring to FIG. 15, if a timeout occurs in state 220 while waiting for a DSC-RSP, the number of retries are checked in state 222. If the number of retries has exceeded some present number, the service change is indicated as unsuccessful in state 236. The CMTS then goes back into the CMTS operational state 180. If there is a timeout in state 220 and the number of retries is not exceeded in state 222, a retry counter is incremented in state 224 and another DSC-REQ is sent in state 226. The CMTS then goes back into the DSC-RSP pending state 218.

If a DSC-RSP is received in state 228 before the timeout, it is checked for an OK response in state 230. If the DSC-RSP does not provide an OK, the service change is indicated as unsuccessful in state 236. If the DSC-RSP is OK, the channel bandwidth is changed in state 232 and a DSC-ACK sent in state 234. The CMTS then goes back into the CMTS operational state 180.

Referring back to FIG. 14, when a DSC-REQ is received in state 182, it is first determined whether the DSC-REQ references an existing SID in state 184. If not, the reply is set to an operational reject in state 198. If the DSC-REQ references an existing SID but the CM is not authorized to make that request in state 186, the reply is set to an administrative reject in state 194. This may occur if the CM has not purchased a certain level of service. If the CM is authorized but resources are not available in state 188, the reply is set to an operational reject in state 198.

The channel bandwidth is increased in state 192 if resources are available, the CM is authorized and a bandwidth increase is requested in state 190. The reply is then set to OK in state 196. After the reply is set in state 194, 196 or 198, a DSC-RSP is sent in state 200 and the CMTS then moves into a CMTS DSC-ACK pending state 202.

Referring to FIG. 16, if a timeout occurs in state 238 and a number of retries is exceeded in state 240, the service change is indicated as unsuccessful in state 254. If the number of retries is not exceeded, the retry counter is incremented in state 242 and another DSC-RSP sent in state 244. The CMTS then goes back into the DSC-ACK pending state 202.

If a DSC-ACK is received in state 246 before the timeout and a lower bandwidth is necessary in state 248, the channel bandwidth is lowered in state 250. If lower bandwidth is not requested, the service change is identified as successful in state 252 and the CMTS moves back into the CMTS operational state 180.

Having described and illustrated. the principles of the invention in a preferred embodiment thereof, it should be apparent that the invention can be modified in arrangement and detail without departing from such principles. I claim all modifications and variation coming within the spirit and scope of the following claims.

What is claimed is:

1. A device, comprising:
a packet processing node receiving packets containing a suppression indicator identifying the packets as having suppressed headers;
a memory storing packet header information for the packets with suppressed headers; and
the packet processing node upon identifying the suppression indicator appending the packet header information stored in memory to the packets with the suppressed headers.

2. A device according to claim 1 wherein the packet processing node comprises a cable modem or a cable modem termination system.

3. A device according to claim 1 wherein the packet processing node sends a signal to another packet processing node initiating header suppression.

4. A device according to claim 3 wherein the packet processing node sends the signal using a Data Over Cable System Interface Specification (DOCSIS) protocol.

5. A device according to claim 1 wherein the suppression indicator is located in a Real-Time Transport Protocol (RTP) header.

6. A device according to claim 1 wherein the suppression indicator associates the packets with a specific flow.

7. A device according to claim 1 wherein the packet processing node uses the suppression indicator to identify a location in memory containing the packet header information for the packets with the suppressed headers.

8. A device according to claim 1 wherein the suppressed header information includes an Ethernet header, Internet Protocol header, or User Datagram Protocol header.

9. A device according to claim 2 wherein the cable modem termination system and the cable modem exchange Dynamic Service Change transmissions that establish multiple microflows for a common cable modem Service Identifier (SID) field.

10. A device according to claim 9 wherein the multiple microflows each carry a different phone call.

11. A device according to claim 9 wherein the multiple microflows each transmit audio packets according to allocated grants, the cable modem concatenating the audio packets for the microflows on the same SID together and transmitting the concatenated audio packets during the same grants.

12. A packet processing node, comprising:
a device identifying one or more packet headers for header suppression and pre-sending packet header information for the identified packet headers,
the device suppressing the identified packet headers in at least some transmitted packets and providing an index with the suppressed header packets that associates the pre-sent packet header information with the suppressed header packets.

13. A packet processing node according to claim 12 wherein the device comprises a cable modem or a cable modem termination system.

14. A packet processing node according to claim 12 wherein the device uses a cable modem protocol to transmit a header suppression notice and the packet header information.

15. A packet processing node according to claim 12 wherein the device locates the index in a non-suppressed header in the transmitted packets.

16. A packet processing node according to claim 15 wherein the device locates the index in a non-suppressed Real-Time Protocol (RTP) header.

17. A packet processing node according to claim 12 wherein the device suppresses an Ethernet header, an Internet Protocol (IP) header, or an User Datagram Protocol (UDP) header in the transmitted packets.

18. A method for transmitting packets, comprising:
identifying one or more packet headers for header suppression;
pre-sending packet header information for the identified packet headers;
suppressing transmission of the identified packet headers when transmitting the packets; and
associating transmitted packets having suppressed headers with the pre-sent packet header information.

19. A method according to claim 18 including receiving an indicator from a network process node initiating header suppression.

20. A method according to claim 19 including receiving the indicator using a Data Over Cable System Interface Specification (DOCSIS) protocol.

21. A method according to claim 18 including assigning an identifier to the suppressed header packets associating the suppressed header packets with the pre-sent packet header information.

22. A method according to claim 21 including locating the identifier in a Real-Time Transport Protocol (RTP) header in the suppressed header packets.

23. A method according to claim 18 including:
pre-sending an Ethernet header, Internet Protocol header, or User Datagram Protocol header to a cable modem termination system;
suppressing the Ethernet header, Internet Protocol header, or User Datagram Protocol header in packets transmitted from a cable modem; and attaching the pre-sent Ethernet header, Internet Protocol header, or User Datagram Protocol header to the suppressed header packets received at the cable modem termination system.

24. A method according to claim 23 including attaching cable network headers to the suppressed header packets transmitted from the cable modem to the cable modem termination system.

25. A method for processing packets, comprising:
receiving one or more packet headers;
storing the identified packet headers;
receiving suppressed header packets having the stored packet headers suppressed; and
appending the stored packet headers to the suppressed header packets.

26. A method according to claim 25 including:
identifying an index value in the suppressed header packets;
using the identified index to reference the stored packet headers; and
appending the referenced packet headers to the suppressed header packets.

27. A method according to claim 26 including:
establishing flows of packets carrying audio or video data;
receiving suppressed header packets associated with the flows of audio or video data;
identifying indexes in the suppressed header packets associating the stored packet headers with the different flows; and
appending the stored packet headers to the suppressed header packets having the same associated flows.

28. A method according to claim 25 including sending an indicator to a sending packet processing node initiating header suppression.

29. A method according to claim 28 including sending the indicator using a Data Over Cable System Interface Specification (DOCSIS) protocol.

30. A method according to claim 25 including locating the indicator in a Real-Time Transport Protocol (RTP) header in the suppressed header packets.

31. An article comprising a machine-accessible medium having associated data that, when accessed, results in the following:
identifying one or more packet headers for header suppression;
pre-sending packet header information for the identified packet headers;
suppressing transmission of the identified packet headers when transmitting the packets; and
associating transmitted packets having suppressed headers with the pre-sent packet header information.

32. The machine-accessible medium according to claim 31 including receiving an indicator from a network process node initiating header suppression.

33. The machine-accessible medium according to claim 32 including receiving the indicator using a Data Over Cable System Interface Specification (DOCSIS) protocol.

34. The machine-accessible medium according to claim 31 including assigning an identifier to the suppressed header packets associating the suppressed header packets with the pre-sent packet header information.

35. The machine-accessible medium according to claim 34 including locating the identifier in a Real-Time Transport Protocol (RTP) header in the suppressed header packets.

36. The machine-accessible medium according to claim 31 including:
pre-sending an Ethernet header, Internet Protocol header, or User Datagram Protocol header to a cable modem termination system;
suppressing the Ethernet header, Internet Protocol header, or User Datagram Protocol header in packets transmitted from a cable modem; and
attaching the pre-sent Ethernet header, Internet Protocol header, or User Datagram Protocol header to the suppressed header packets received at the cable modem termination system.

37. An article comprising a machine-accessible medium having associated data that, when accessed, results in the following:
receiving one or more packet headers;
storing the identified packet headers;
receiving suppressed header packets having the stored packet headers suppressed; and
appending the stored packet headers to the suppressed header packets.

38. The machine-accessible medium according to claim 37 including:
identifying an index value in the suppressed header packets;
using the identified index to reference the stored packet headers; and
appending the referenced packet headers to the suppressed header packets.

39. The machine-accessible medium according to claim 38 including:
establishing flows of packets carrying audio or video data;
receiving suppressed header packets associated with the flows of audio or video data;
identifying indexes in the suppressed header packets associating the stored
packet headers with the different flows; and
appending the stored packet headers to the suppressed header packets having the same associated flows.

40. The machine-accessible medium according to claim 37 including sending an indicator to a sending packet processing node initiating header suppression.

41. The machine-accessible medium according to claim 40 including sending the indicator using a Data Over Cable System Interface Specification (DOCSIS) protocol.

42. The machine-accessible medium according to claim 37 including locating the indicator in a Real-Time Transport Protocol (RTP) header in the suppressed header packets.

43. A system for transmitting packets, comprising:
means for identifying one or more packet headers for header suppression;
means for pre-sending packet header information for the identified packet headers;
means for suppressing transmission of the identified packet headers when transmitting the packets; and
means for associating transmitted packets having suppressed headers with the pre-sent packet header information.

44. A system according to claim 43 including means for receiving an indicator from a network process node initiating header suppression.

45. A system according to claim 44 including means for receiving the indicator using a Data Over Cable System Interface Specification (DOCSIS) protocol.

46. A system according to claim 43 including means for assigning an identifier to the suppressed header packets associating the suppressed header packets with the pre-sent packet header information.

47. A system according to claim 46 including means for locating the identifier in Real-Time Transport Protocol (RTP) header in the suppressed header packets.

48. A system according to claim 43 including:
means for pre-sending an Ethernet header, Internet Protocol header, or User Datagram Protocol header to a cable modem termination system;
means for suppressing the Ethernet header, Internet Protocol header, or User Datagram Protocol header in packets transmitted from a cable modem; and
means for attaching the pre-sent Ethernet header, Internet Protocol header, or User Datagram Protocol header to the suppressed header packets received at the cable modem termination system.

49. A system according to claim 48 including means for attaching cable network headers to the suppressed header packets transmitted from the cable modem to the cable modem termination system.

50. A system for processing packets, comprising:
means for receiving one or more packet headers;
means for storing the identified packet headers;
means for receiving suppressed header packets having the stored packet headers suppressed; and
means for appending the stored packet headers to the suppressed header packets.

51. A system according to claim 50 including:
means for identifying an index value in the suppressed header packets;
means for using the identified index to reference the stored packet headers; and
means for appending the referenced packet headers to the suppressed header packets.

52. A system according to claim 51 including:
means for establishing flows of packets carrying audio or video data;
means for receiving suppressed header packets associated with the flows of audio or video data;
means for identifying indexes in the suppressed header packets associating the stored packet headers with the different flows; and
means for appending the stored packet headers to the suppressed header packets having the same associated flows.

53. A system according to claim 50 including means for sending an indicator to a sending packet processing node initiating header suppression.

54. A system according to claim 53 including means for sending the indicator using a Data Over Cable System Interface Specification (DOCSIS) protocol.

55. A system according to claim 50 including means for locating the indicator in a Real-Time Transport Protocol (RTP) header in the suppressed header packets.

* * * * *